United States Statutory Invention Registration [19]

Pitruzzello et al.

[11] Reg. Number: H491

[43] Published: Jul. 5, 1988

[54] FIBER OPTIC ATTENUATOR

[75] Inventors: Michael C. Pitruzzello, Huntsville; Carolyn S. Randles, Guntersville, both of Ala.

[73] Assignee: The United States of America as represented by the Secretary of the Army, Washington, D.C.

[21] Appl. No.: 115,937

[22] Filed: Oct. 23, 1987

[51] Int. Cl.[4] ..... G02B 6/32

[52] U.S. Cl. ..... 350/96.18; 350/96.2

*Primary Examiner*—Stephen C. Buczinski
*Assistant Examiner*—Linda J. Wallace
*Attorney, Agent, or Firm*—John C. Garvin, Jr.; Freddie M. Bush; James T. Deaton

[57] ABSTRACT

A fiber optic attenuator in which male and female members connect a fiber to detector means with an attenuator member mounted between the end of the fiber and the detector for reducing the signal from the fiber before arriving at the detector to reduce the signal arriving at the detector sufficient to prevent the detector from becoming saturated and making it impossible to recover the video signal transmitted through the fiber.

5 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

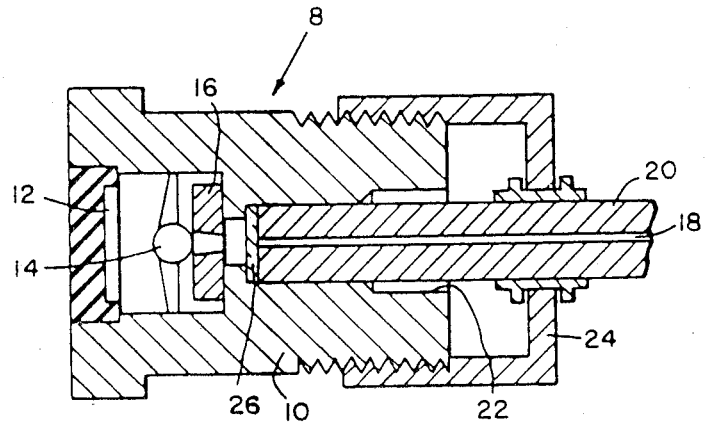
8
16
12
14
20
18
24
26
10
22

FIBER OPTIC ATTENUATOR

DEDICATORY CLAUSE

The invention described herein may be manufactured, used, and licensed by or for the Government for governmental purposes without the payment to us of any royalties thereon.

BACKGROUND OF THE INVENTION

In the past, fiber optic attenuators have been in use, but such devices are usually precision laboratory quality devices and are thus relatively large and expensive. Therefore, there is a need for an attentuator in which the optical attenuator is relatively small in size, inexpensive, and an optical attenuator in which attenuator variations of a few decibles are not critical.

Accordingly, it is an object of this invention to provide an optical attenuator which is small in size and relatively inexpensive.

Another object of this invention is to provide an optical attenuator in which attenuator variations of a few decibles are allowable and are not critical to the system in which the optical attenuator is to be used.

Still another object of this invention is to provide an optical attenuator for a system in which precision attenuation is not required.

Other objects and advantages of this invention will be obvious to those skilled in this art.

SUMMARY OF THE INVENTION

In accordance with this invention, a fiber optic attenuator is provided by inserting a small glass disk that is doped with metal on the surface thereof and polished on opposite sides of the disk with the disk placed in a fiber optic connector and between the window of the connector and the end of a fiber to attenuate the signal emanating from the fiber before it passes through the window and from the window onto a detector.

BRIEF DESCRIPTION OF THE DRAWINGS

The single FIGURE of the drawing is a sectional view illustrating the fiber optic attenuator in accordance with this invention.

DESCRIPTION OF THE PREFERRED EMBODIMENT

Referring now to the drawing, fiber optic attenuator 8 includes a connector plug 10 that is threaded at its outer periphery as illustrated and includes a detector 12 mounted at one end and internally of connector 10, a lens 14 mounted internally of detector 12, and window 16 mounted in coupling 10 for transmitting light to lens 14 for focusing the light energy onto detector 12. Fiber 18 has a connector ferrule 20 mounted therearound in a conventional manner and is adapted to be received in stepped bore 22 of connector 10 to be mounted and connected thereto. Cap connector portion 24 is connected to connector ferrule 20 in a conventional manner as illustrated and is threaded onto the outer surface of connector 10 to complete the connection between fiber 18 and bore 22 of connector 10. An attenuator disk 26 is placed at the end of fiber 18 and the opening of attenuator coupling 10 to attenuate excess signal emanating from the end of fiber 18. Attenuator disk 26 has the opposite surfaces thereof polished in a conventional manner and optical grease may be desired in the joint between attenuator disk 26 and the end of fiber 18 in some applications. Attenuator disk 26 is made of fused silica with sputtered metal thereon to accomplish the attenuation of the signal from optical fiber 18. The sputtered metal is generally aluminum or other alloy metals that are known and used in this type environment. A specific glass that can be used is commercially known BK7 which has been doped with a sputtered metal. Other commercially available glass with the proper doping can also be used.

An attenuator such as applicant's attenuator 26 is needed when the signal emanating from fiber 18 is too great for detector 12 to handle this much signal. This condition can occur when a system is designed to have a long length of fiber when in actuality the length of the fiber is reduced substantially for example to one-tenth of the designed length. In this type arrangement, the signal actually transmitted to the end of fiber 18 is too great for detector 12 to handle this much signal. Therefore, there is a need for an attenuator that can reduce the signal emanating from fiber 18 so that detector 12 will not be saturated and make it impossible to recover the transmitted video signal. In a system of this type, a few decibles of attenuation are not critical to the proper functioning of the device to recover the desired video signal.

We claim:

1. A fiber optic attenuator having male and female connector members, said male connector member having an opening therethrough with a detector mounted at one end of said opening and internally of said male connector member, and means for focusing energy from a fiber onto said detector, said female connector member being connected to one end of a fiber and having fastening means for securing said female connector member to said male connector member with the fiber mounted in said male connector member, and an attenuator member mounted in said male connector member between one end of said fiber and said focusing means for attenuating and reducing signal emanating from said fiber and before reaching said detector.

2. A fiber optic attenuator as set forth in claim 1, wherein said attenuator member is made of fused silica and has metal on the surface thereof to reduce attenuation of energy emanating from said fiber.

3. A fiber optic attenuator as set forth in claim 2, wherein said metal is aluminum.

4. A fiber optic attenuator as set forth in claim 3, wherein said focusing means is a lens and a window.

5. A fiber optic attenuator as set forth in claim 4, wherein said attenuator member is a disk and has a uniform thickness with one surface of said disk contacting a surface of said opening through the male connector member and the other surface of said disk contacting an end of said fiber.

* * * * *